No. 746,922. PATENTED DEC. 15, 1903.
W. U. CHAPIN.
TOBACCO STICK.
APPLICATION FILED FEB. 26, 1903.
NO MODEL. 2 SHEETS—SHEET 1.
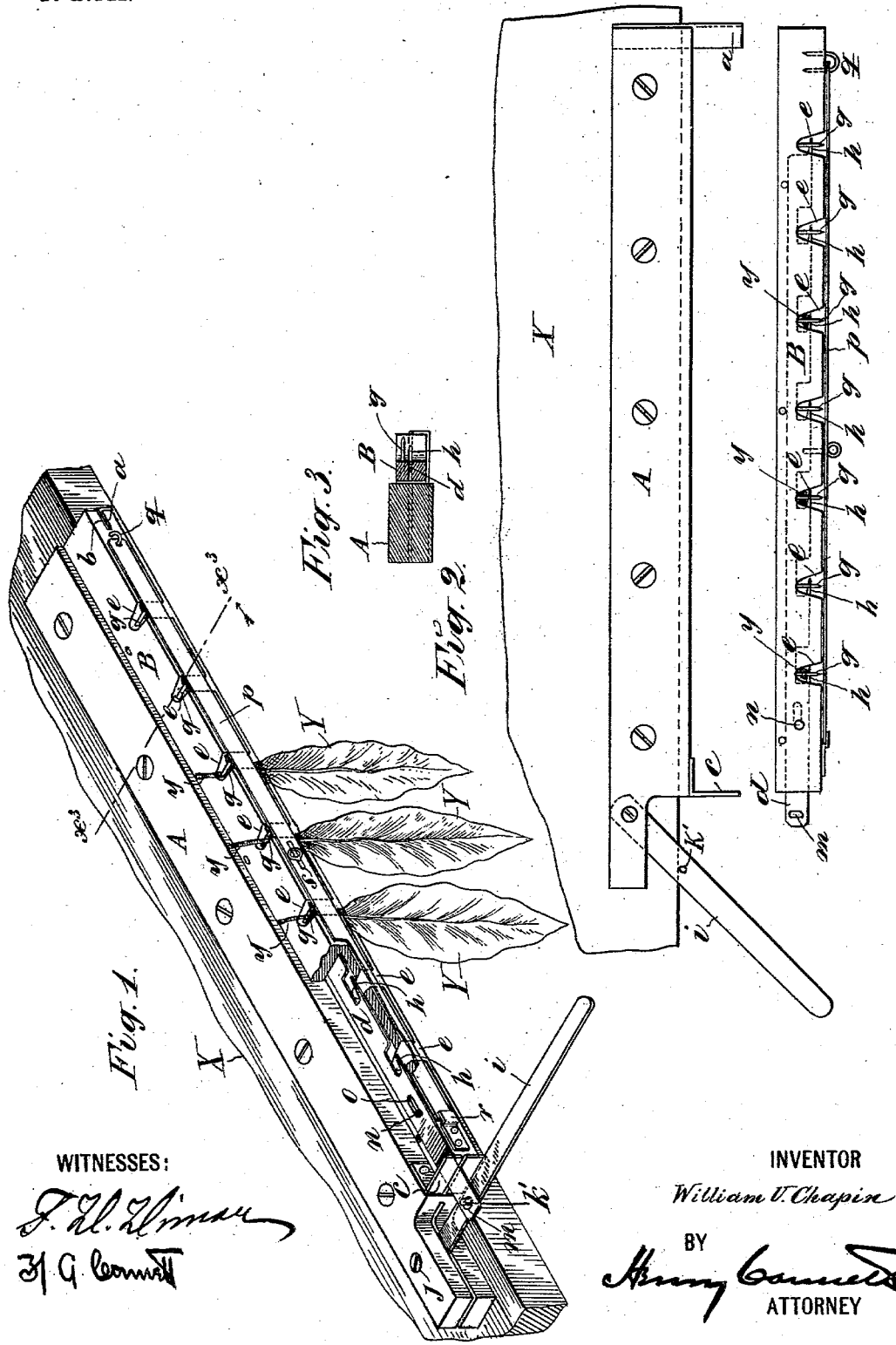
WITNESSES:
INVENTOR
William U. Chapin
BY
ATTORNEY No. 746,922. PATENTED DEC. 15, 1903.
W. U. CHAPIN.
TOBACCO STICK.
APPLICATION FILED FEB. 26, 1903.
NO MODEL. 2 SHEETS—SHEET 2.
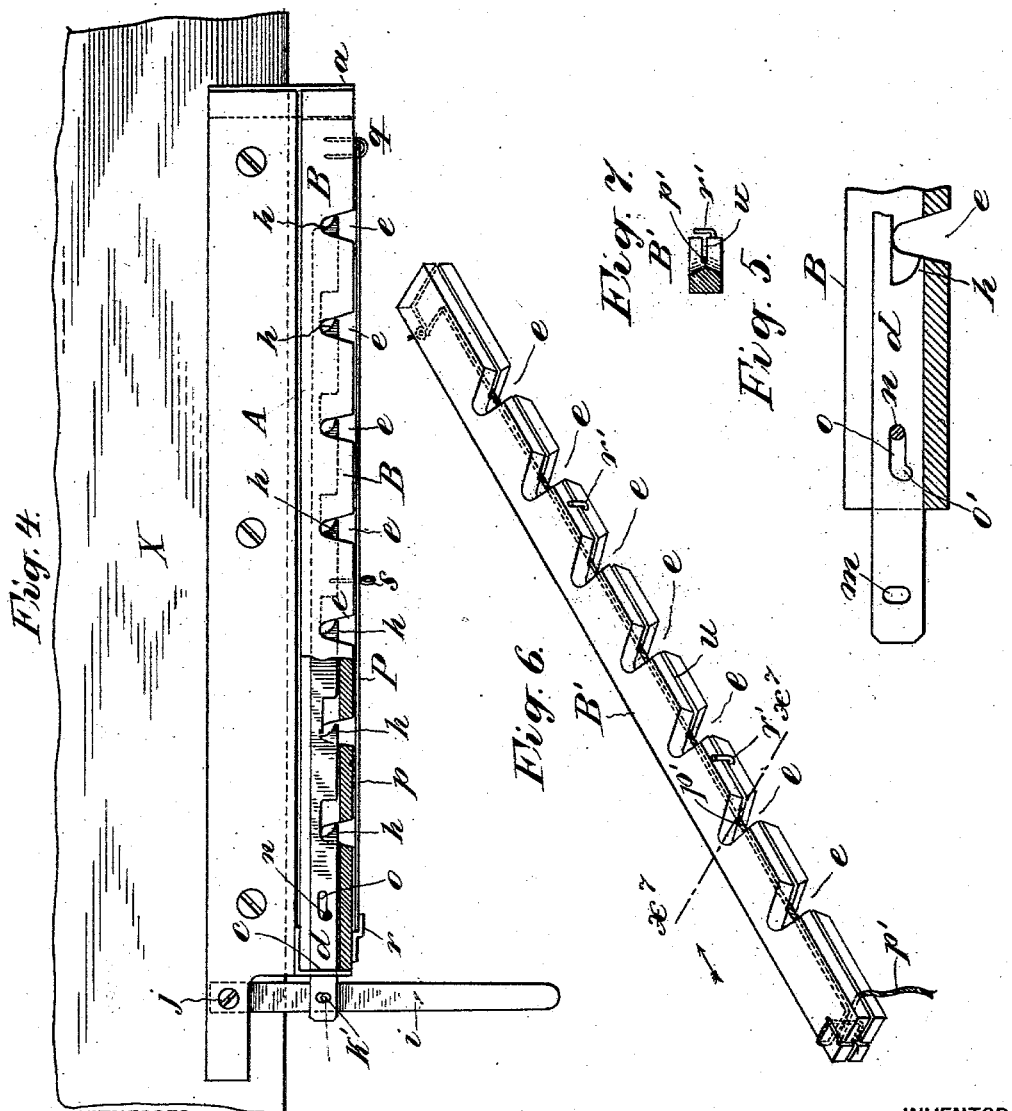
WITNESSES:
INVENTOR
William U. Chapin
BY
ATTORNEY No. 746,922. Patented December 15, 1903.

UNITED STATES PATENT OFFICE.

WILLIAM U. CHAPIN, OF COLLINSVILLE, CONNECTICUT.

TOBACCO-STICK.

SPECIFICATION forming part of Letters Patent No. 746,922, dated December 15, 1903.

Application filed February 26, 1903. Serial No. 145,164. (No model.)

*To all whom it may concern:*

Be it known that I, WILLIAM U. CHAPIN, a citizen of the United States, residing at Collinsville, Hartford county, in the State of Connecticut, have invented certain new and useful Improvements in Tobacco-Sticks, of which the following is a specification.

This invention relates to devices for suspending the leaves of tobacco for curing them. Sticks, rods, and cords have been used for this purpose, and the leaves have been strung on threads, so as to be suspended for drying or curing.

The object of the present invention is to provide a simple and inexpensive device which may be filled and locked quickly and one which will hold each leaf firmly and securely and keep it separated from the other leaves.

In the accompanying drawings, which serve to illustrate the invention, Figure 1 is a perspective view of the stick and the holder for the latter. This view shows the stick mounted in the holder. Fig. 2 is a plan of the same, showing the stick charged with leaves and detached from the holder. Fig. 3 is a cross-section at the line $x^3$ in Fig. 1. Fig. 4 is a plan of the device as seen in Fig. 1, but showing a slightly different form of tooth in the sliding gripper. The teeth or prongs are omitted from the stick in this view. Fig. 5 is a detail view of the slidable gripper and its guide. Fig. 6 is a perspective view of a simpler embodiment of the invention, and Fig. 7 is a cross-section of same at $x^7$ in Fig. 6.

Referring to Figs. 1 to 4, X designates a table or support of any kind, on which is secured a holder A for the tobacco-stick B while the latter is being filled or charged with tobacco-leaves Y. The holder A is a bar, usually of wood, screwed down to the table and provided with a thin metal bracket-piece $a$, which engages a slot $b$ in the end of the stick B, and a slotted bracket-plate $c$, which receives in its slot the projecting end of a sliding gripper $d$ in the stick B. These parts $a$ and $c$ on the holder A support the stick B in the positions seen in Figs. 1 and 4 while the stick is being filled or charged with tobacco-leaves. Fig. 2 shows the filled stick B detached from the holder A. The stick B has in its front edge notches $e$ properly spaced and distanced and designed to receive each the stem $y$ of a tobacco-leaf Y. For illustration three of the tobacco-leaves are shown in Fig. 1. At the bottom of each notch $e$ in Figs. 1 and 2 is set a tooth or prong $g$ to penetrate the leaf-stem, and mounted slidably in the stick is the sliding gripper $d$, provided with teeth $h$, adapted to be moved to and fro across the respective notches $e$ for piercing the stems of the leaves in the other direction. For operating the gripper $d$ a lever $i$ of thin springy material is fulcrumed at $j$ on the holder and carries a stud $k'$, which engages an aperture $m$ in the projecting end of the gripper for operating the latter. The sliding gripper $d$ is guided on a stud or pin $n$, which passes through a slot $o$ in the gripper, and this slot has a slight lateral recess $o'$, Fig. 5, near one end to engage the pin $n$ when the gripper is pushed in. In Figs. 1 and 4 the pin $n$ is shown as engaging this lateral locking-recess in the slot, and in Fig. 5 the pin is seen at the other end of the slot. When the sliding gripper $d$ is pushed in, so that the teeth thereon are in engagement with the stems of the leaves, the lateral recess $o'$ receives the pin $n$ and the two form a retaining device for the gripper, but one of which may be overcome by the application of a sharp pull on the latter. After the leaves are in place in the notches of the stick B a closing-strip $p$ is set in place. This strip is hinged to the front of the stick at $q$, and at its free end it takes under a keeper $r$ on the stick. As the stick B is usually of considerable length—say four feet—there will be by preference one or more keeper devices for holding the light strip $p$ up to the face of the stick. One of these is shown, and it consists of a screw-eye $s$, which passes through a slot $t$ in the strip and screws into the face of the stick. By turning the screw-eye so that it will pass through the slot the strip $p$ is released, and it may be released from the keeper $r$ by bending it outward at the middle.

The operation of the invention will now be described. The stick B, with the binding-strip $p$ released and hanging down from its hinge-point $q$ and the sliding gripper $d$ drawn out, as in Fig. 5, is placed in the holder A by engaging the bracket-piece *a* with the slot *b* and the projecting end of the gripper *d* with the slot in the bracket-plate *c*. The operator then inserts the stems *y* of the tobacco-leaves sidewise into the several notches *e* by causing the teeth *g* to pierce them. The lever *i* is now coupled to the gripper by springing it sidewise until stud *k* thereon engages the aperture *m*, when the gripper is forced in by the lever, causing the teeth *h* thereon to pierce the stems of the leaves. The lever *i* is now uncoupled and the strip *p* put in place and secured in the manner before explained. The stick B, with its charge of leaves, is now removed from the holder and hung up in the usual way.

In Fig. 4 the construction is substantially the same as in Fig. 1; but the teeth *g* are omitted from the stick, and the sliding gripper is relied upon to hold the stems of the leaves from slipping out. The teeth *h* on the gripper are shown in this view as shaped a little differently from those in the principal views. These teeth may vary in shape without departing materially from the invention.

Figs. 6 and 7 show a simpler form of the stick. In these views the gripper is omitted from the stick B' and a cord *p'* is substituted for the closing-strip *p*. To enable this cord when taut to bear forcibly on the stems of the leaves in the notches *e*, there is a slot *u* in the stick to receive the cord when it is drawn tight. Keeper-hooks *r'* are provided to keep the cord in place. The margins of the notches in the stick are beveled above and below, so as to form rather sharp edges to bite into the stems of the leaves and assist thus in holding the latter in place when pressed in by the cord.

Having thus described my invention, I claim—

1. The combination with a holder provided with projecting brackets to engage and support the tobacco-stick, of the said stick, having a plurality of notches in its front edge to receive the stems of the leaves, means carried by the stick at the respective notches and which prevent the leaves from slipping out therefrom by a longitudinal movement of their stems, and binding means, also carried by the stick and extending the entire length of the same which prevents the escape of the leaves from the notches.

2. A tobacco-stick, having spaced notches to receive the stems of the leaves, a toothed sliding gripper mounted in the stick and provided with teeth, one at each notch, for gripping the stem of the leaf to hold it from slipping out longitudinally, and a binder extending lengthwise of the stick to prevent the escape of the stems from the notches.

3. A tobacco-stick, having in its face a series of spaced notches to receive the stems of the leaves, a sliding gripper mounted in a slot in the stick and extending longitudinally of the same, said gripper having a tooth at each notch to engage the leaf-stem, and means for holding said gripper in its operative position.

4. A tobacco-stick, having in its face a series of spaced notches to receive the stems of the leaves, a tooth *g* in each notch to transfix and hold the leaf-stem, and a sliding gripper *d* mounted in the stick and provided with teeth to engage the said stems.

5. The combination of a tobacco-stick having in its edge a plurality of spaced notches to receive the stems of the respective leaves, and a movable and adjustable binder mounted on the stick to prevent the stems from escaping from the notches, with a fixed holder for said stick, said holder being provided with thin metal brackets which project out in front of the holder and engage some parts of said stick and support it while being filled.

6. The combination with a holder A, having means for supporting and retaining the tobacco-stick in place, and a lever *i*, fulcrumed in said holder, of the tobacco-stick B, having a series of notches *e* in its face to receive the stems of the leaves, and the sliding gripper *d* mounted in the stick and provided with teeth one at each notch in the stick, and with means for coupling it to the lever *i* for operation, substantially as set forth.

In witness whereof I have hereunto signed my name, this 20th day of February, 1903, in the presence of two subscribing witnesses.

WILLIAM U. CHAPIN.

Witnesses:
M. J. McFarland,
Benj. F. Carr.